(12) United States Patent
Widmark (10) Patent No.: US 12,030,348 B2
(45) Date of Patent: Jul. 9, 2024

(54) SYSTEMS, METHODS AND COMPUTER PROGRAM PRODUCTS FOR DETECTING REDUCED TIRE PRESSURE

(71) Applicant: NIRA Dynamics AB, Linköping (SE)

(72) Inventor: Mats Widmark, Linköping (SE)

(73) Assignee: NIRA Dynamics AB, Linköping (SE)

( * ) Notice: Subject to any disclaimer, the term of this patent is extended or adjusted under 35 U.S.C. 154(b) by 103 days.

(21) Appl. No.: 17/782,138

(22) PCT Filed: Nov. 24, 2020

(86) PCT No.: PCT/EP2020/083214
§ 371 (c)(1),
(2) Date: Jun. 2, 2022

(87) PCT Pub. No.: WO2021/110479
PCT Pub. Date: Jun. 10, 2021

(65) Prior Publication Data
US 2023/0010882 A1    Jan. 12, 2023

(30) Foreign Application Priority Data
Dec. 3, 2019 (DE) .......................... 102019132859.4

(51) Int. Cl.
*B60C 23/06*    (2006.01)
(52) U.S. Cl.
CPC .......... *B60C 23/067* (2013.01); *B60C 23/061* (2013.01)
(58) Field of Classification Search
CPC ............................. B60C 23/067; B60C 23/061
(Continued)

(56) References Cited

U.S. PATENT DOCUMENTS 2,607,836 A    8/1952    Stevens
2,957,058 A  * 10/1960   Trott ....................... B60C 23/06
                                                       280/682

(Continued)

FOREIGN PATENT DOCUMENTS

DE    112009003587 B4    12/2018
DE    102017219941 A1     5/2019
(Continued)

OTHER PUBLICATIONS

European Patent Office, PCT International Search Report and Written Opinion, Application No. PCT/EP2020/083214, dated Feb. 12, 2021, 9 pages.

(Continued)

*Primary Examiner* — Eric Blount
(74) *Attorney, Agent, or Firm* — Mahamedi IP Law LLP (57) ABSTRACT

The disclosure relates to systems, methods and computer program products for detecting tire pressure loss in tires of a vehicle. The system comprises a sensor, which is arranged at the vehicle remotely from the tires, mechanically coupled at least indirectly to a chassis of the 5 vehicle, and configured to detect a property indicative of tilting spatial movement of the chassis. The system further comprises a processing unit, which is communicatively coupled with the sensor, configured to receive sensor signals from the sensor, the sensor signals being indicative of tilting spatial movement of the chassis, and configured to detect a tire pressure based on the sensor signals. The processing unit is configured to detect a tire pressure loss responsive to the 10 sensor signals indicating a tilting spatial movement of the chassis towards the at least one tire.

12 Claims, 6 Drawing Sheets

(58) Field of Classification Search
USPC .......................................................... 340/443
See application file for complete search history.

(56) References Cited

U.S. PATENT DOCUMENTS

| | | |
|---|---|---|
| 6,571,481 B1 | 6/2003 | Weiss |
| 8,130,089 B2 * | 3/2012 | Hill ..................... B60C 23/0408 |
| | | 340/447 |
| 2008/0262784 A1 * | 10/2008 | Massoni ................. B60C 23/06 |
| | | 73/146 |

FOREIGN PATENT DOCUMENTS

| | | | | |
|---|---|---|---|---|
| EP | 1982850 A1 * | 10/2008 | ............. | B60C 23/06 |
| JP | H0682327 A | 3/1994 | | |
| JP | 2000255231 A | 9/2000 | | |
| KR | 20190096100 A | 8/2019 | | |

OTHER PUBLICATIONS

German Patent and Trademark Office, Office Action, DE Application No. 102019132859.4, mailed Mar. 20, 2020, 5 pages.

\* cited by examiner

SYSTEMS, METHODS AND COMPUTER PROGRAM PRODUCTS FOR DETECTING REDUCED TIRE PRESSURE

TECHNICAL FIELD

The present invention disclosure generally relates to detection of reduced tire pressure in tires of a vehicle.

BACKGROUND OF THE INVENTION

Tire pressure monitoring systems are commonly installed in road vehicles such as passenger cars, and are mandatory by law in many countries. This improves safety in case of a puncture, as well as contributes to reduced fuel consumption if a driver is alerted of the fact that tires are generally underinflated.

Generally, any system is based on direct pressure measurement, e.g. with a pressure sensor inside each tire, or indirect pressure measurement, wherein sensor signals from other sensors (e.g. wheel speed signals from wheel speed sensors) are processed to obtain an estimate of the tire pressure.

In any case, these systems generally require that the vehicle is moving for a pressure determination to take place. For instance, wheel-speed-based indirect systems of course require a measurement of wheel speed, i.e. a moving vehicle.

However, tire pressure loss often does not occur instantaneously upon puncture, but progressively over an extended period of time. This period may extend into the standstill after the vehicle has been parked. In other words, a puncture which has occurred while driving may not cause enough pressure loss during the drive for the monitoring to detect the pressure loss before the car is stopped.

However, during standstill, the tire continues to lose pressure, in some cases even completely. This pressure loss would not be detected until the vehicle is moving again. Similarly, tire pressure loss due to an event during standstill (such as a criminal stabbing the tire of a parked vehicle) would not be detected before the vehicle is moving again.

OBJECT OF THE INVENTION

In order to overcome shortcomings of known approaches, particularly of the kind mentioned above, an object of the present invention is to provide solution for detecting tire pressure losses.

SUMMARY OF THE INVENTION

Systems, methods, computer program products and apparatuses for detecting tire pressure loss in at least one of a plurality of tires of a vehicle are provided.

Generally, the invention makes use of sensor signals indicative of tilting spatial movement of the chassis. This allows to detect a tilting of the chassis, which is due to a pressure loss, and thereby detect a pressure loss. For the purpose of the present disclosure, a "pressure loss" may refer to any state with substantially reduced pressure, irrespective of whether the reduction is complete or only partial.

According to a first aspect, a system for detecting tire pressure loss in at least one of a plurality of tires of a vehicle is provided. The system comprises a sensor and a processing unit.

The sensor is arranged at the vehicle remotely from the tires, mechanically coupled at least indirectly to the chassis of the vehicle, and configured to detect a property indicative of tilting spatial movement of the chassis. By virtue of the mechanical coupling to the chassis, the sensor may follow any movement related to the movement of the chassis. Such movement may—inter alia—be due to a pressure loss in at least one of the tires. The sensor is to detect a property indicative of tilting spatial movement of the chassis. Further, such an arrangement foregoes the disadvantages of having the sensor incorporated in the tire, as it would be the case of known direct tire pressuring systems. The present disclosure thus relates to pressure loss detection, wherein sensor signals from other sensors (i.e. not incorporated into the tire) are processed, i.e. indirect pressure loss detection.

Examples of the sensors of the system include accelerometers of the vehicle or suspension sensors, indicative of the operation of a suspension system of the vehicle (i.e. the operation state, e.g. whether and by how much the suspension system is compressed or extended).

Consequently, examples of such properties include, as will be detailed further below, an acceleration or a suspension measure.

The processing unit is communicatively coupled with the sensor, configured to receive sensor signals from the sensor, the sensor signals being indicative of tilting spatial movement of the chassis, and configured to detect a tire pressure based on the sensor signals.

In some embodiments, the processing unit may be configured to detect a tire pressure loss responsive to the sensor signals indicating a tilting spatial movement of the chassis towards the at least one tire. For example, such tilting spatial movement may comprise a rotation around an axis, the axis going essentially through the center of mass of the vehicle.

For instance, the property detectable by the sensor may be an acceleration, in particular an acceleration value or an acceleration vector. An acceleration vector has at least two or three components. For instance, a three-dimensional acceleration vector may comprise components in longitudinal, lateral and vertical directions, which may or may not coincide with the respective axes of the chassis or the vehicle. Alternatively, a two-dimensional acceleration vector may comprise a longitudinal and a lateral direction.

For example, the sensor may comprise an accelerometer for detecting a tilting spatial movement of the chassis relative to a gravitational acceleration axis. Examples of such sensors include one or more of the following: a lateral accelerometer for detecting a lateral acceleration of the chassis; a longitudinal accelerometer for detecting a longitudinal acceleration of the chassis; a vertical accelerometer for detecting a vertical acceleration of the chassis; or any combination of the afore-mentioned (such as longitudinal/lateral).

In particular, in such cases, the processing unit may be configured to detect a tire pressure loss, responsive to the sensor signals of the accelerometer indicating a rotational or tilting movement of the chassis relative to the gravitational acceleration axis. The gravitational acceleration axis points vertically essentially towards center of the earth. Accelerometers generally detect the acceleration corresponding to gravity (or the normal counter-force thereto). Thus, a rotation of the accelerometer induces a rotation of the coordinate system of the accelerometer. The gravitational axis remaining constant, its representation in the coordinate system of the accelerometer changes by the same amount as the accelerometer is rotated. After rotation (or tilting), the accelerometer detects that the gravitational axis has "rotated" (at least in the coordinate system of the accelerometer). Thus, a tilting of the chassis translates into a change of the direction and/or magnitude of the gravitational axis, as detected by the accelerometer coupled to the chassis.

This principle of detecting a tilt of the chassis relative to an earth-fixed reference vector may also be applied with a sensor comprising a magnetic detector or compass: In such examples, the sensor may comprise an magnetic sensor for detecting a tilting spatial movement of the chassis relative to a magnetic north azimuth axis. An example of such sensors includes a strapdown magnetic detector unit (SMDU), which measures the magnetic field in three axis, for instance. Consequently, in such cases, the processing unit may be configured to detect a tire pressure loss, responsive to the sensor signals of the magnetic sensor indicating a rotational or tilting movement of the chassis relative to the magnetic north azimuth axis. The magnetic north azimuth axis points essentially towards the magnetic north of the earth. Magnetic sensors generally detect the direction corresponding to an earth-fixed reference. Thus, a rotation of the magnetic sensor (together with the chassis) induces a rotation of the coordinate system of the magnetic sensor. The earth-fixed reference axis remaining constant, its representation in the coordinate system of the magnetic sensor changes by the same amount as the magnetic sensor is rotated. After rotation (or tilting), the magnetic sensor detects that the magnetic north azimuth axis has "rotated" (at least in the coordinate system of the magnetic sensor). Thus, a tilting of the chassis translates into a change of the direction and/or magnitude of the magnetic north azimuth axis, as detected by the magnetic sensor coupled to the chassis. In this respect, the example of using a magnetic sensor is essentially similar to the example of using a accelerometer. In both cases, a tilt of the chassis relative to an earth-fixed reference vector.

Additionally, or alternatively to accelerometers, sensors indicative of the state of the wheel suspension may be used. For instance, the property detectable by the sensor may be a suspension measure, in particular a suspension leg extension length or a suspension pressure value.

In such cases, the sensor may comprise a suspension sensor for detecting spatial movement of the chassis relative to a wheel of the vehicle. In some embodiments, the system may comprise a plurality of sensors, in particular one suspension sensor per wheel.

Examples of suspension sensors may comprise one or more of the following: a pneumatic pressure sensor, indicative of a pneumatic pressure within at least one suspension system; a hydraulic pressure sensor, indicative of a hydraulic pressure within at least one suspension system of the vehicle; a suspension leg extension sensor, indicative of a leg length of at least one suspension system of the vehicle; an air pressure sensor, indicative of an air pressure within at least one suspension system of the vehicle. The particular type of sensor may be chosen in dependence of the suspension system of the vehicle. Generally, modern vehicles may be equipped with suspension sensors for other purposes, e.g. for headlight inclination control or for dynamic driving behavior during cornering. The invention according to the present disclosure may make use of such sensors.

As described above, a pressure loss in at least one tire leads to a tilting of the chassis and thereby to a change in load in the suspension sensors.

In particular, considering the example of a vehicle with four wheels, a chassis plane may be defined by the extension or compression. For illustration purposes, a state where all four suspension sensors indicate equal extension/compression would correspond to an essentially horizontal (or non-tilted) chassis plane. If one tire loses pressure, the chassis will tilt into the direction of this tire. The suspension sensor at said wheel (as well as the diagonally opposing wheel) will show an increased extension. As a result, the sensor signals from suspension sensors indicate whether the chassis has tilted.

By comparison across multiple suspensions sensor at different corners of the vehicle, it may be ascertained whether the chassis movement is a tilting movement (rather than a linear lifting or lowering due to load changes, for instance).

According to a second aspect, the present disclosure relates to a use of a system according to the first aspect in a vehicle for detecting a tire pressure loss. Such use may in particular comprise one or more of the steps of a method according to the third aspect.

According to a third aspect, the present disclosure relates to a method for detecting a tire pressure loss in at least one of a plurality of tires of a vehicle. The method comprises a receiving of sensor signals from a sensor. The sensor is arranged at the vehicle remotely from the tires, mechanically coupled at least indirectly to a chassis of the vehicle, and configured to detect a property indicative of tilting spatial movement of the chassis.

The method further comprises a determining whether the sensor signals are indicative of a tilting spatial movement of the chassis towards the at least one tire. In particular, the determining may comprise an establishing of a chassis plane, indicative of the orientation of the chassis, in particular relative to a suspension plane or to a gravitational acceleration axis.

The method also comprises a detecting of a tire pressure loss responsive to the determining. In particular, in case it has been determined that the sensor signals are indicative of a tilting spatial movement of the chassis towards the at least one tire, a tire pressure loss may be considered to be detected.

Additionally, the method may comprise receiving a reference reading from the sensor, receiving a detection reading from the sensor, and detecting whether the sensor signals are indicative of a tilting spatial movement of the chassis based on a comparison of the detection reading with the reference reading.

In some embodiments, the reference reading may be collected responsive to the detection of a standstill of the vehicle and/or the detection reading may be collected responsive to the detection of ignition of the vehicle.

According to a fourth aspect, the present disclosure relates to a computer program product including program code configured to, when executed in a computing device, to carry out the steps of a method of the third aspect.

DETAILED DESCRIPTION OF PREFERRED EMBODIMENTS

In the following, description is given of a few preferred embodiments, wherein—for illustration a first embodiment makes use of an accelerometer and a second embodiment makes use of suspension sensors. However, as mentioned above, the present disclosure is not restricted to these two types of sensors.

According to a first embodiment of a system, the sensor of the system is an accelerometer coupled to the chassis of the vehicle. For illustration purposes, an accelerometer with three sensitive axes is described, although other embodiments may comprise an accelerometer with other numbers of axes.

In any cases, the sensor signals are indicative of tilting spatial movement of the chassis. This allows to detect a tilting of the chassis, which is due to a pressure loss, and thereby detect a pressure loss.

Figure 1:
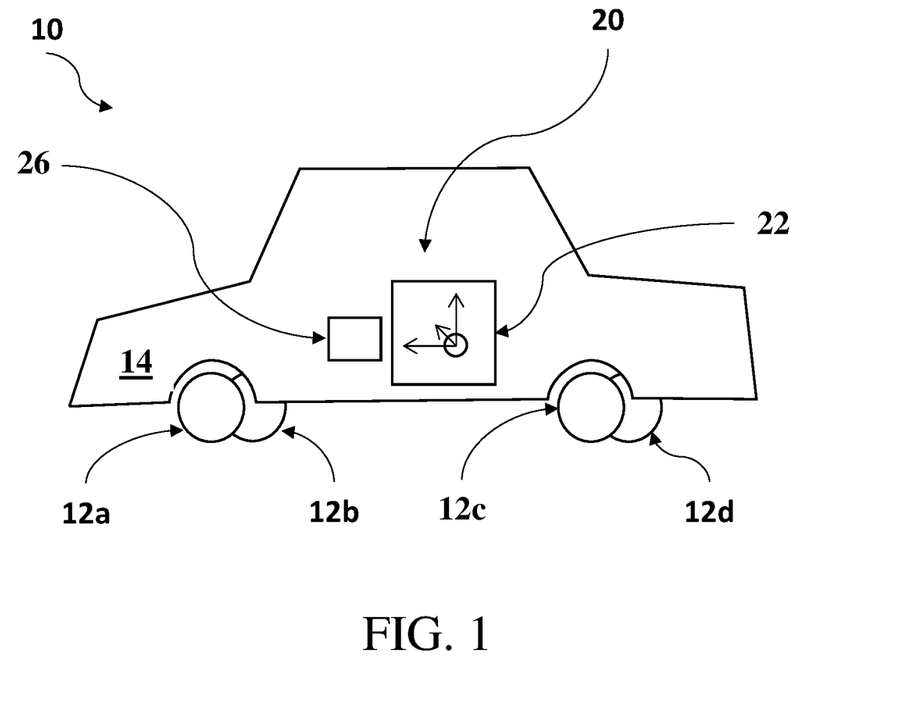
FIG. 1 is a schematic representing a vehicle with a system according to a first embodiment.

FIG. 1 is a schematic representing a vehicle 10 with a system 20 according to the first embodiment. System 20 is for detecting tire pressure loss in at least one of a four tires 12a, 12b, 12c, 12d of vehicle 10 is provided. The system comprises an accelerometer 22 and a processing unit 26.

The sensor 22 is arranged at the vehicle remotely from the tires 12a, 12b, 12c, 12d, mechanically coupled (at least indirectly) to the chassis 14 of vehicle 10, and configured to detect an acceleration vector. The acceleration vector is a property indicative of tilting spatial movement of the chassis.

Modern cars are equipped with accelerometers, such as accelerometer 22, for a variety of purposes, including but not limited to electronic stability systems.

The acceleration vector output by the accelerometer 22 as its sensor signal may indicate the direction and magnitude of acceleration, i.e. forces acting on the vehicle 10 in general and on the chassis 14 in particular. For instance, during driving these forces would include the forward propulsion by the vehicle itself (originating from the engine, drive train, wheels etc.), and lateral acceleration during cornering. During standstill, no forces arise from the vehicle's own driving motion.

In any case, the accelerometer 22 measures external forces. Inter alia, the sensor is statically affected by earth gravity (or its static counter-force on a stationary object, to be strict). As a result, in the absence of any other forces during standstill, the accelerometer 22 outputs the direction of gravity as a vector (or its counter-direction depending on sign convention), with magnitude 1g.

In the case of FIG. 1, accelerometer 22 is mechanically coupled to chassis 14 and aligned such that the X and Y directions of the accelerometer lie in the plane of the chassis, whereas the Z direction of the accelerometer is perpendicular to the plane of the chassis. As a result of the mechanical coupling, the acceleration vector output by accelerometer 22 as sensor signal is indicated in the reference system (or coordinate system) of the chassis, as will be detailed further below with reference to FIG. 2.

Returning to FIG. 1, the processing unit 26 is communicatively coupled with the accelerometer 22. The processing unit 26 is configured to receive sensor signals from the accelerometer 22 and configured to detect a tire pressure loss based on the sensor signals. The sensor signals are indicative of tilting spatial movement of the chassis 14, in particular towards any tire with reduced pressure.

In particular, the processing unit 26 is configured to detect the tire pressure loss responsive to the sensor signals indicating a tilting spatial movement of the chassis 14 towards said tire.

In the case of FIG. 1, the property detectable by the sensor is an acceleration, in particular an acceleration vector. To this end, the sensor is or at least comprises an accelerometer for detecting a tilting spatial movement of the chassis relative to a gravitational acceleration axis.

Examples of such sensors include the following: a lateral accelerometer for detecting a lateral acceleration of the chassis; a longitudinal accelerometer for detecting a longitudinal acceleration of the chassis; a vertical accelerometer for detecting a vertical acceleration of the chassis; or any combination of the afore-mentioned. In the case of the first embodiment, the accelerometer 22 is a three-axis accelerometer, which detects a lateral acceleration, a longitudinal acceleration and a vertical acceleration.

Consequently, the processing unit 26 is configured to detect a tire pressure loss, responsive to the sensor signals of the accelerometer 22 indicating a rotational or tilting movement of the chassis 14 relative to the gravitational acceleration axis.

This detecting is described in the following with reference to FIG. 2, which is a schematic representing a use of the system according to the first embodiment to detect a pressure loss in the rear right tire. In particular, FIG. 2A depicts the vehicle 10 in a perspective view before pressure loss, whereas FIG. 2B depicts—in an exaggerated measure, for illustration purposes—the vehicle 10 in the same perspective view after pressure loss in the rear right tire.

In this illustrative example, a pressure loss in the rear right tire may lead to a lowering of the rear right corner, a lifting of the front left corner. This may correspond essentially to a rotation around an axis, which runs essentially from the rear left corner to the front right corner of the vehicle.

Under such illustration, the terms "tilting spatial movement towards a certain tire" may more generally be understood as a movement of the chassis, in which the corner of the chassis where said tire is located is lowered and an opposing corner is lifted.

Figure 2:
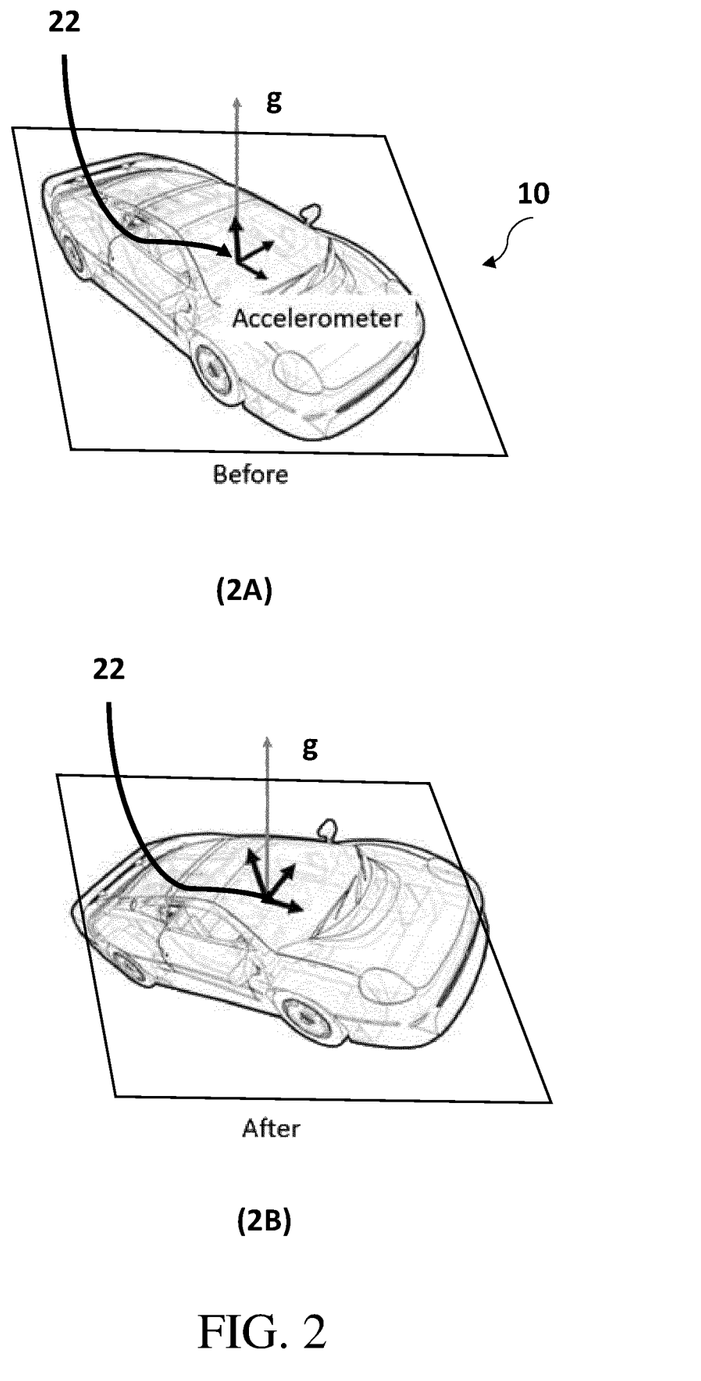
FIG. 2 is a schematic representing use of a system according to the first embodiment.

Similarly, although not shown in FIG. 2, a tilting of the chassis may occur towards two tires, in particular if these two tires show a pressure loss. For instance, tire pressure loss in both right tires induces a lowering of both right corners of the chassis (rear right and front right). As such, the tilting occurs around essentially around a longitudinal axis of the vehicle. Such tilting may be represented by a superposition of the two tilting motion, a first tilting towards the rear right and a second tilting towards the front right.

Returning to FIG. 2, the accelerometer 22 is also shown together with its three sensitive axes. Accelerometer 22 is mechanically coupled to the chassis of vehicle 10. In addition, an axis g is shown which illustrates the static counter-force to earth gravity. This counter-force is perpendicular to the ground on which the vehicle 10 is parked.

For illustration purposes, if the chassis would be oriented perfectly horizontally, gravity would act in Z direction only. In such cases, the acceleration vector has a Z component of essentially (plus or minus) g. Further, the acceleration vector has X and Y components of essentially zero.

In the case of a pressure loss in at least one of the tires, the vehicle tilts towards said at least one tire. For instance, in the case of a pressure loss in the rear right tire, the vehicle will tilt such that the rear right corner of the vehicle is lowered.

In such a case, the chassis 14 (and thereby the reference system of the accelerometer 22) tilts. Continuing this illustrative example, the gravity acceleration as detected by the accelerometer 22 does no longer coincide with the Z axis of the sensor. Instead, it has gained X and Y components, which are different from zero. In the case of a pressure loss in the rear right, the X and Y components in the accelerometer signal due to gravity acceleration point towards the rear right. Consequently, the X and Y components of static counter-gravity point towards the front left, as can be seen from FIG. 2B.

Such change in acceleration vector (sensor signal) may for instance be detected by static before/after-type comparison, e.g. by subtracting a detection reading (after) from a reference reading (before). These readings may for instance be measured before and after a prolonged period of standstill.

The above description has been made for illustration purposes at the example of a three-axis accelerometer. In other embodiments, the accelerometer may be sensitive to at least longitudinal and lateral acceleration (in the chassis plane, i.e. X and Y of the example above).

Further, the above description has been made under the assumption of an alignment of the Z axis with the gravitational axis before pressure loss. As can be seen from this simplified description, the change in acceleration vector points towards (or away from, depending on sign convention) the tire with reduced pressure. This relationship holds true, irrespective of the above-made assumptions.

In a second embodiment of a system, which will be described in the following, the sensor of the system are suspension sensors, located at the suspension leg at each wheel. These sensors are coupled to the chassis of the vehicle by means of the suspension being coupled to the chassis. For illustration purposes, a vehicle with four wheels and one suspension sensor per wheel is described, although other embodiments may comprise other numbers of wheels and/or other numbers of suspension sensors per wheel.

In any case, the suspension sensor signals are indicative of tilting spatial movement of the chassis. This allows to detect a tilting of the chassis, which is due to a pressure loss, and thereby detect a pressure loss.

Figure 3:
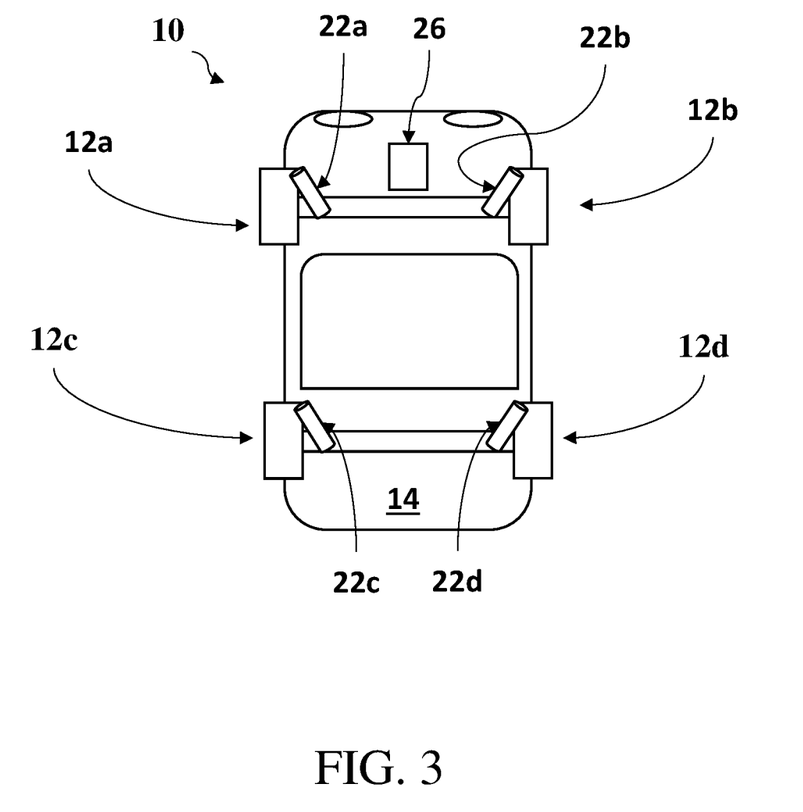
FIG. 3 is a schematic representing a vehicle with a system according to a second embodiment.

FIG. 3 is a bottom-view schematic representing a vehicle 10 with a system according to the second embodiment. The system is for detecting tire pressure loss in at least one of a four tires 12a, 12b, 12c, 12d of vehicle 10. The system comprises suspension sensors 22a, 22b, 22c, 22d and a processing unit 26. A pair of suspension sensor and tire 12a is located at a each respective corner of vehicle 10.

Figure 4:
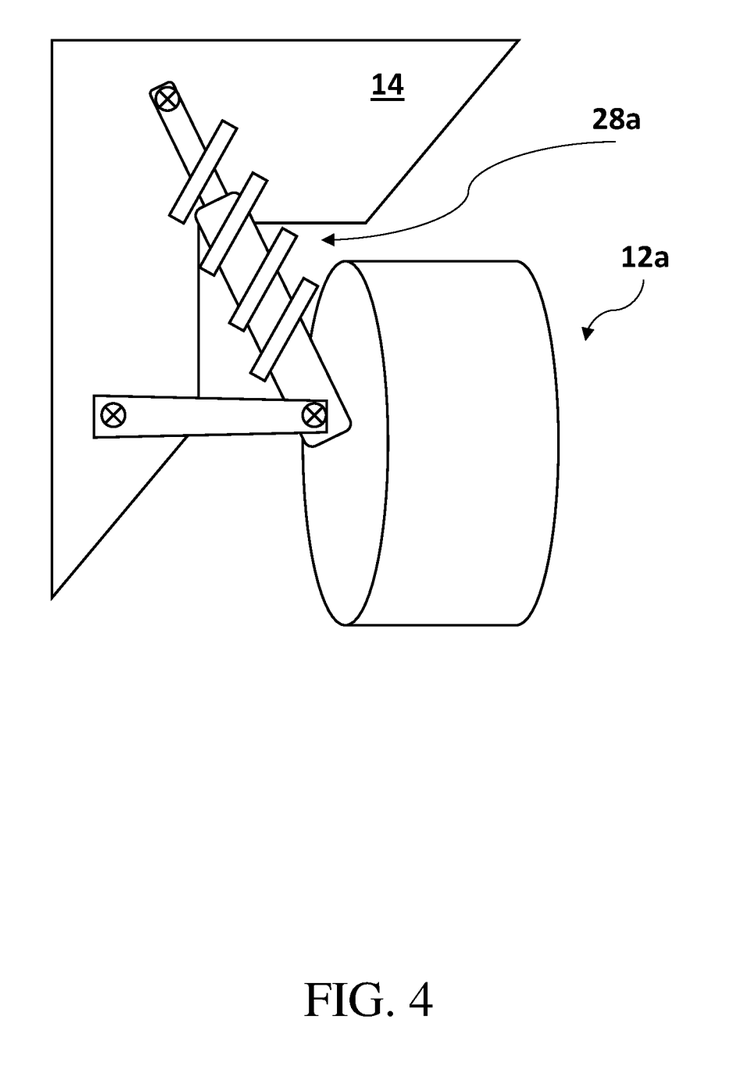
FIG. 4 is a schematic representing a portion of the system according to the second embodiment.

FIG. 4 shows a close-up schematic of a portion of the system at tire 12a. Suspension sensor 22a is a suspension leg extension sensor, indicative of a leg length at strut 28a. As such, the suspension sensor 22a yields data indicative of the state of the wheel suspension. It detects a suspension leg extension length, which is a suspension measure to be used as a property for the detecting of a pressure loss according to the present disclosure.

The example shown in FIG. 4 is a mechanical spring type suspension and the sensor is a suspension leg extension sensor, indicative of a leg length of at the suspensions system of the vehicle. In other examples, the suspension system may be of hydraulic type and a hydraulic pressure sensor may be used, which would be indicative of a hydraulic pressure within the hydraulic system. In still further examples, the suspension system may be of air pressure or pneumatic type and an air pressure or pneumatic sensor may be used, which would be indicative of an air pressure or pneumatic pressure within at least one air suspension system. Thus, the particular type of sensor may be chosen in dependence of the suspension system of the vehicle.

The sensor 22a is for detecting spatial movement of the chassis relative to a wheel of the vehicle. This foregoes the disadvantages associated with measuring an axle-road distance. By detecting the spatial movement of the chassis, in particular its tilting, measurement sensitivity may be increased by virtue of the leverage effect across the width or length of the vehicle. Further, suspension sensors (indicative of the extension/compression state of the suspension) are present in many vehicles.

As described above, a pressure loss in at least one tire leads to a tilting of the chassis and thereby to a change in load in the suspension sensors.

In particular, considering the example of a vehicle with four wheels, a chassis plane may be defined by the extension or compression of the corresponding suspension sensors. As mentioned above, a state where all four suspension sensors indicate equal extension/compression would correspond to an essentially "horizontal" chassis plane. If one tire loses pressure, the chassis will tilt into the direction of this tire. The suspension sensor at said wheel (as well as the diagonally opposing wheel) will show an increased extension. As a result, the sensor signals from suspension sensors indicate whether the chassis is tilted.

Figure 5:
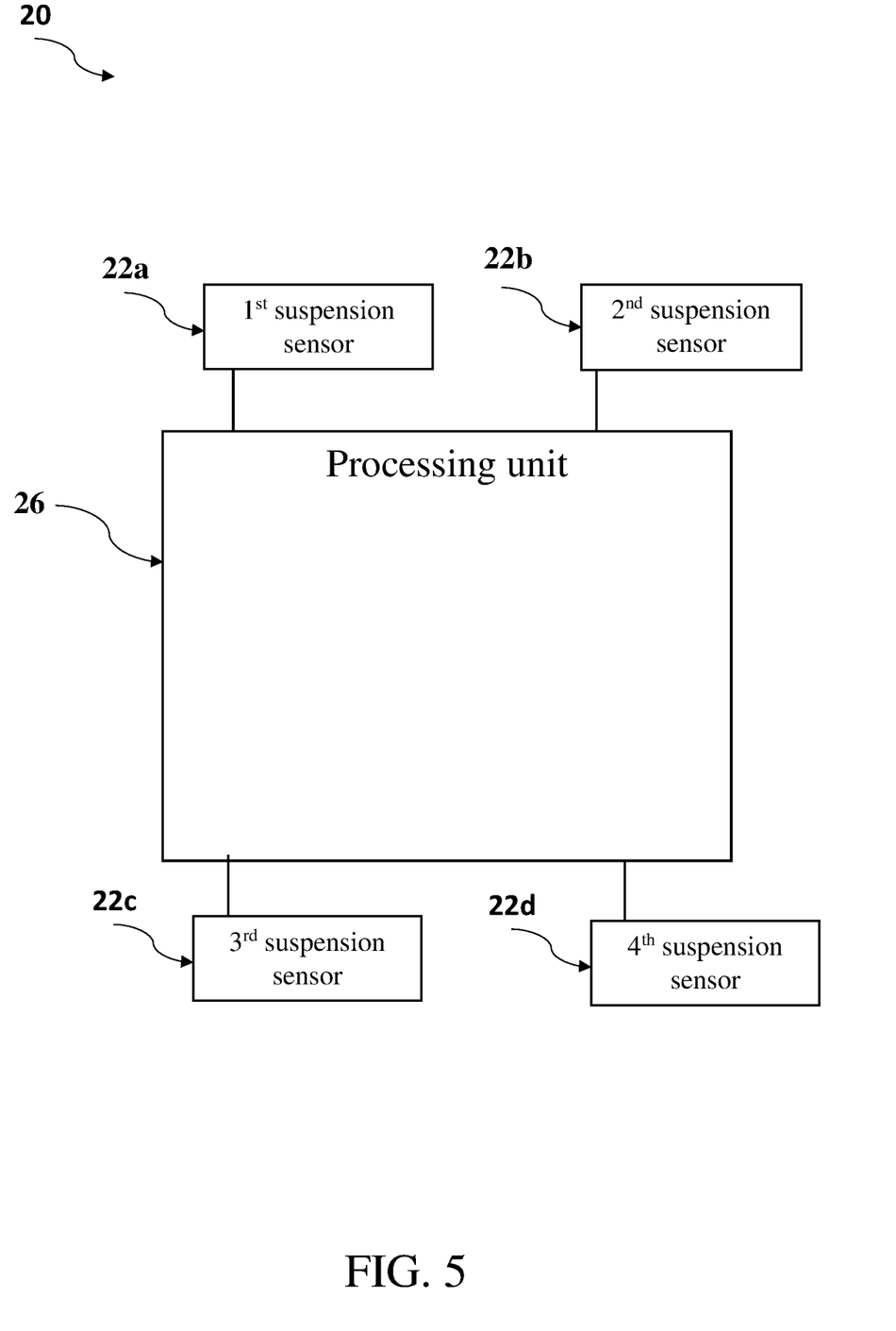
FIG. 5 is a box diagram of the system according to the second embodiment.

FIG. 5 is a box diagram of the system 20 according to the second embodiment. The system 20 comprises four suspension sensors 22a, 22b, 22c, 22d, which are communicatively coupled to processing unit 26. By considering the sensor signals from multiple corners of the vehicle (rather than each wheel in isolation), a chassis plane may be reconstructed from the set of readings.

By considering an initial reference reading and a later detection reading, the movement of the chassis plane (e.g. over the extended period of time while the vehicle has been parked) can be reconstructed.

By considering the chassis plane, rather than each wheel in isolation, the teaching according to the present disclosure allows to better detect the source of any change. For instance, an essentially uniform change over all corners (i.e. essentially a lifting or lowering of the entire chassis plane) may be attributed to a load change, whereas a tilting of the chassis plane may be attributed to a pressure loss.

Figure 6:
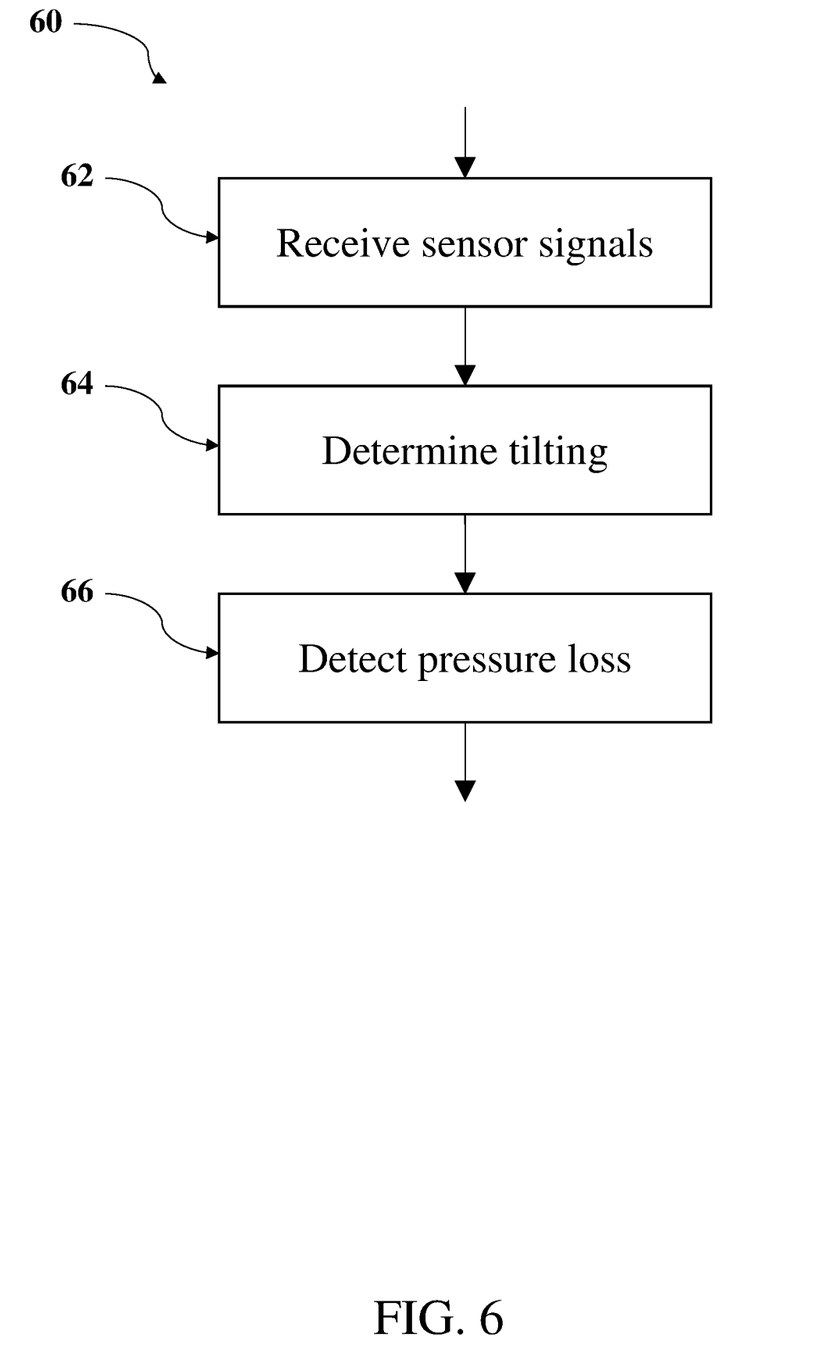
FIG. 6 is a flow chart of a method according to embodiments.

FIG. 6 is a flow chart of a method 60 according to embodiments. The method 60 is for detecting a tire pressure loss in at least one of a plurality of tires of a vehicle. The method 60 comprises a receiving 62 of sensor signals from a sensor. The sensor is arranged at the vehicle remotely from the tires, mechanically coupled at least indirectly to a chassis of the vehicle, and configured to detect a property indicative of tilting spatial movement of the chassis.

In particular, the receiving 62 may comprise a first receiving and a second receiving, wherein the first receiving relates to first sensor signals (i.e. a reference reading, e.g. a first acceleration vector), measured at a first point in time. The second receiving relates to second sensor signals (i.e. a detection reading, e.g. a second acceleration vector), measured at a second, later point in time. The first and second sensor signals (reference and detection readings) may have been measured sequentially by a same sensor. For instance, the first point in time (reference) may be (shortly) before the vehicle is turned off (ignition-off), once it has been parked. The second point in time (detection measurement) may be (shortly) after the vehicle is turned on (ignition-on), before it starts to move.

Similarly, in the case of a suspension-based detecting, a first chassis plane may be constructed at a first point in time and a second chassis plane may be constructed at a second point in time. For change detection, a difference of the normal vectors to the two planes may be computed.

In case at least one of the tires has lost pressure while it has been parked, the method 60 will be able to detect such pressure loss: To this end, the method further comprises a determining 64 whether the sensor signals are indicative of a tilting spatial movement of the chassis towards the at least one tire.

Finally, the method comprises a detecting 66 of a tire pressure loss responsive to the determining. In the above-described case of first and second sensor signals, the change in sensor signals may be indicative of a pressure loss. Considering the example of first and second acceleration vectors, a difference of vectors may be computed during the determining 64. In case, the (magnitude of the) difference vector is not essentially zero (or exceeds a predetermined threshold), a pressure loss may be detected (step 66). Further, the direction of the difference vector may indicate which one(s) of the tires has/have lost pressure, as has been described further above with reference to FIG. 2.

In other examples, sensor signals from multiple types of sensors (e.g. both accelerometer-type sensors and suspension-type sensors) may be received (step 62). In such cases, a pressure loss may be detected (step 66) if one of the type of signals indicates a tilting (step 64). Alternatively, a pressure loss may be detected (step 66) if both (or all) types of signals indicate a tilting (step 64). The former increases sensitivity (reduced false negatives), the latter reduces false positives (increased reliability).

In other embodiments, not shown, the method may further comprise outputting the result of the determining. For instance, the result may be outputted in the form of an alarm (e.g. visual, acoustic, electronic, or any combination thereof, within the vehicle or to an electronic device of the driver) or as a control signal (e.g. to be further processed by on-board-electronics, or connected driving).

The invention claimed is:

1. A system for detecting tire pressure loss in at least one of a plurality of tires of a vehicle, comprising:
    a sensor, the sensor being
        arranged at the vehicle remotely from the tires,
        mechanically coupled at least indirectly to a chassis of the vehicle, and
        configured to detect a property indicative of tilting spatial movement of the chassis;
    a processing unit, the processing unit being
        communicatively coupled with the sensor,
        configured to receive sensor signals from the sensor, the sensor signals being indicative of tilting spatial movement of the chassis, and wherein the sensor signals comprise (i) a reference reading from the sensor collected responsive to the detection of a standstill of the vehicle, and (ii) a detection reading from the sensor collected responsive to the detection of ignition of the vehicle;
        configured to detect a tire pressure based on the sensor signals, wherein the processing unit is configured to detect a tire pressure loss responsive to the sensor signals indicating a tilting spatial movement of the chassis towards the at least one tire based on a comparison of the detection reading with the reference reading.

2. The system of claim 1, wherein the property is an acceleration, in particular an acceleration value or an acceleration vector.

3. The system of claim 1, wherein the sensor comprises an accelerometer for detecting a tilting spatial movement of the chassis relative to a gravitational acceleration axis.

4. The system of claim 1, wherein the sensor comprises one or more of the following:
    a lateral accelerometer for detecting a lateral acceleration of the chassis,
    a longitudinal accelerometer for detecting a longitudinal acceleration of the chassis,
    a vertical accelerometer for detecting a vertical acceleration of the chassis.

5. The system of claim 3, wherein the processing unit is configured to detect a tire pressure loss, responsive to the sensor signals of the accelerometer indicating a rotational or tilting movement of the chassis relative to the gravitational acceleration axis.

6. The system of claim 1, wherein the property is a suspension measure, in particular a suspension leg extension length or a suspension pressure value.

7. The system of claim 1, wherein the sensor comprises a suspension sensor for detecting spatial movement of the chassis relative to a wheel of the vehicle.

8. The system of claim 7, wherein the suspension sensor comprises one or more of the following:
    a pneumatic pressure sensor, indicative of a pneumatic pressure within at least one suspension system;
    a hydraulic pressure sensor, indicative of a hydraulic pressure within at least one suspension system of the vehicle;
    a suspension leg extension sensor, indicative of a leg length of at least one suspension system of the vehicle; and
    an air pressure sensor, indicative of an air pressure within at least one suspension system of the vehicle.

9. A method for detecting a tire pressure loss in at least one of a plurality of tires of a vehicle, comprising:
    receiving sensor signals from a sensor, the sensor being
        arranged at the vehicle remotely from the tires,
        mechanically coupled at least indirectly to a chassis of the vehicle, and
        configured to detect a property indicative of tilting spatial movement of the chassis; movement of the chassis, wherein the receiving comprises (i) receiving a reference reading from the sensor collected responsive to the detection of a standstill of the vehicle, and (ii) receiving a detection reading from the sensor collected responsive to the detection of ignition of the vehicle;
    determining whether the sensor signals are indicative of a tilting spatial movement of the chassis towards the at least one tire based on a comparison of the detection reading with the reference reading;
    determining whether the sensor signals are indicative of a tilting spatial movement of the chassis towards the at least one tire; and
    detecting a tire pressure loss responsive to the determining.

10. The method of claim 9, wherein the determining comprises establishing a chassis plane, indicative of the orientation of the chassis, in particular relative to a suspension plane or to a gravitational acceleration axis.

11. A storage means that stores a computer program product including program code configured to, when executed in a computing device, to carry out the steps of:
    receiving sensor signals from a sensor, the sensor being
        arranged at the vehicle remotely from the tires,
        mechanically coupled at least indirectly to a chassis of the vehicle, and
        configured to detect a property indicative of tilting spatial movement of the chassis;
    determining whether the sensor signals are indicative of a tilting spatial movement of the chassis towards the at least one tire;

wherein the sensor signals comprise (i) a reference reading from the sensor collected responsive to the detection of a standstill of the vehicle and (ii) a detection reading from the sensor collected responsive to the detection of ignition of the vehicle and detecting a tire pressure loss responsive to the determining and based on a comparison of the detection reading with the reference reading.

12. The storage means of claim 11, wherein the determining comprises establishing a chassis plane, indicative of the orientation of the chassis, in particular relative to a suspension plane or to a gravitational acceleration axis.

* * * * *